United States Patent Office 2,794,276
Patented June 4, 1957

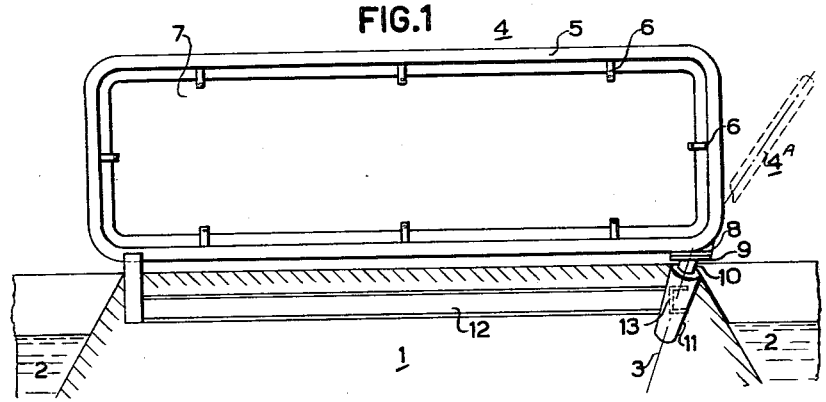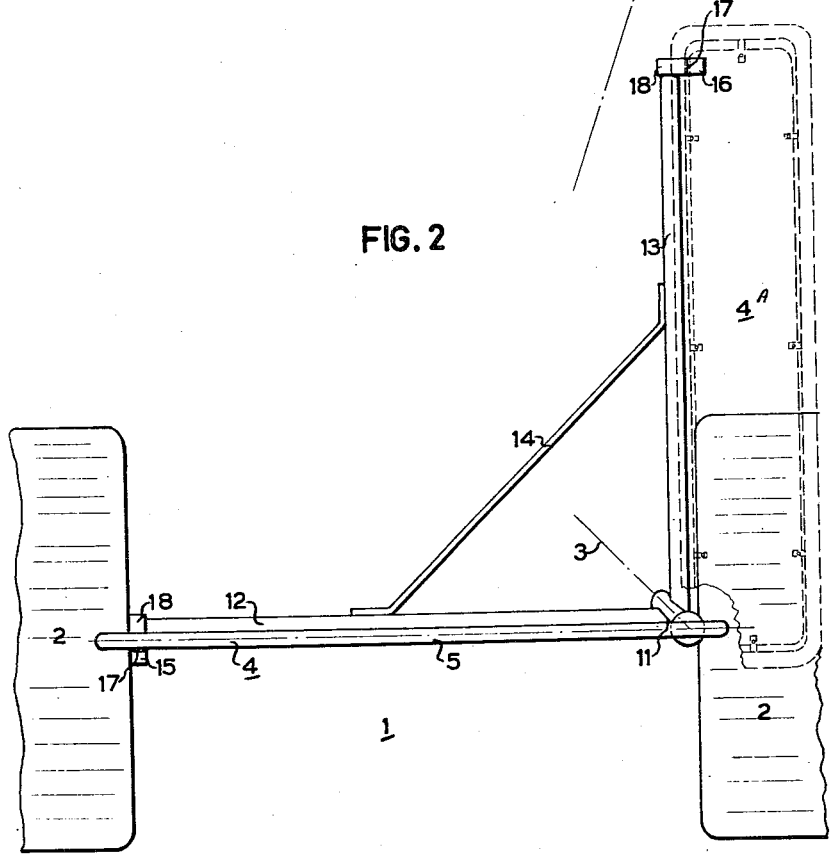

2,794,276
NON-OBSTRUCTING TYPE PIVOTED GATE

Cornelis van der Lely and Ary van der Lely, Maasland, Netherlands

Application January 28, 1954, Serial No. 406,812

Claims priority, application Netherlands January 30, 1953

4 Claims. (Cl. 39—55)

This invention relates to a closure and more particularly to a gate or door which is swingable about an axis of rotation near one of its lateral ends, said gate being situated in closed position substantially in a vertical plane.

It is an object of the present invention to provide a closure of this kind which has practically no tendency to become opened or closed by wind or other disturbing effects. More specifically the object of the invention is to provide a gate or door structure having the tendency to remain open in open position and to remain closed in closed position without needing special latching means.

According to the invention this is obtained by the feature that the axis of rotation is obliquely arranged in a vertical plane forming an acute angle with the plane of the gate in closed position.

Further objects, features and details of the present invention will appear from the following description with reference to the accompanying drawing in which a preferred embodiment of a gate according to the invention has been illustrated by way of example and in which:

Fig. 1 shows a front elevation of a dam gate according to the invention and

Fig. 2 is a plan view thereof.

In the illustrated embodiment a dam 1, which is formed in a ditch 2 between two plots of land interconnected by the said dam, is provided with a closure comprising a gate swingable on an axis of rotation 3, said gate being designated in closed position by the reference numeral 4 and in open position by the reference 4A. The gate is constituted by a frame 5 bent from a tube and provided with projecting parts 6 carrying a panel 7.

Near one of its lower corners this frame 5 is provided with a flange 8 welded thereto, a flange 9 being secured to the flange 8 by means of bolts and said flange 9 being integral with a pin 10 extending in the direction of the axis of rotation 3. The pin 10 is journaled in a bushing 11 for rotation about the axis 3 and the bearing of said pin is such that rainwater cannot enter the bushing and lubrication, which should take place e. g. once a year, can be effected in a simple manner.

The oblique position of the bushing 11 is ensured by two beams 12 and 13 welded to the bush and interconnected by a bar 14. The beam 12 further carries an abutment 15 for the gate in its closed position, whereas the beam 13 is provided with an abutment 16 for the gate in its open position.

The flanges 8 and 9 constitute a removable connection permitting the transport of the whole device in two parts which are easier manageable, viz. the gate 4 on the one hand and the structure comprising the beams 12 and 13 with the bushing 11 and the abutments 15 and 16 on the other hand.

The vertical plane passing through the axis 3 forms an angle of 45° with the plane of the gate in closed position. As a consequence the parts of the frame 5 which are horizontal in closed position of the gate will be horizontal again in open position of the gate. In the vertical plane through the axis 3 said axis forms an angle of about 30° with a vertical line. In consequence thereof the projection of the axis upon the plane of the gate in the closed position, which plane is a vertical one, will form an angle of about 22° with the vertical. The angle between the vertical and the gate in the opened position 4A will therefore be two times as large or 44°, so the plane of the gate in open position forms an angle of about 46° with a horizontal plane. Such position of the gate is very practical, since due to this position the gate will not come easily into contact with the load of wide-loaded vehicles. Gates of this kind may, therefore, be carried out narrower than gates which are swingable about a vertical axis.

Since in the intermediate positions the gate is at a higher elevation than in its extreme positions, less hindrance will be met with snow, ground bound by frost and the like.

Since in the structure according to the invention, especially in case of a relatively large inclination of the axis of rotation, the gate has the tendency to strike against its abutments with an appreciable velocity, it is preferable that both abutments are resilient.

The most favorable position of the gate with regard to the axis of rotation and the abutments is obtained when the axis of rotation 3 intersects the frame 5 near one of the lower corners. The abutments are preferably carried out in such a manner that they do not only present a vertical abutting surface 17, but also a horizontal bearing surface 18 for the gate in the abutting position, so that when the gate is loaded in such position by downwardly directed vertical forces, after an admissible elastic deformation the frame will be sustained on the horizontal bearing surface of the abutment.

What we claim is:

1. A gate structure comprising support means, a gate supported by said support means, a pin connected to said support means and a bushing for housing said pin at less than a right angle with respect to a plane, said gate being supported along an axis which is normal to said plane when said gate is closed and which has one end at the junction of said pin and said support means, said gate rotating about the junction of said pin and said support means in conjunction with the rotating of said pin in said bushing when the gate is opened whereby the gate is displaced from the normal axis.

2. A closure for a passage comprising a pin having a longitudinal axis, a gate coupled at its lowermost side to said pin, an elongated hollow body supported in the ground, said pin being pivotally placed in said hollow body to form a hinge for said gate, and an abutment fixed with respect to said hollow body for controlling the closed position of said gate, said axis of said pin extending obliquely through a vertical plane passing through said axis and said abutment.

3. A closure for a passage comprising a pin having a longitudinal axis, a gate coupled at its lowermost side to said pin, an elongated hollow body supported in the ground, said pin being pivotally placed in said hollow body to form a hinge for said gate, a first abutment fixed with respect to said hollow body for controlling the closed position of said gate, said axis of said pin extending obliquely through a vertical plane passing through said axis and said first abutment, and a second abutment fixed with respect to said hollow body for controlling the open position of the gate, and means for connecting said first and said second abutments to said elongated hollow body.

4. A closure for a passage comprising a pin having a longitudinal axis, a gate coupled at its lowermost side to said pin, an elongated hollow body supported in the ground, said pin being pivotally placed in said hollow body to form a hinge for said gate, and a resilient abutment fixed with respect to said hollow body for controlling the closed position of said gate, said axis of said pin extending obliquely through a vertical plane passing through said axis and said resilient abutment.

References Cited in the file of this patent
UNITED STATES PATENTS

| | | |
|---|---|---|
| 217,260 | Brady | July 8, 1879 |
| 217,325 | Bond | July 8, 1879 |
| 1,338,209 | Bruber | Apr. 27, 1920 |